United States Patent [19]

Lygum

[11] Patent Number: 5,329,916
[45] Date of Patent: Jul. 19, 1994

[54] OVEN

[75] Inventor: Poul Lygum, Bakel, Netherlands

[73] Assignee: Koppens Machinefabriek B.V., Bakel, Netherlands

[21] Appl. No.: 22,951

[22] Filed: Feb. 25, 1993

[30] Foreign Application Priority Data

Feb. 26, 1992 [NL] Netherlands ............... 9200351

[51] Int. Cl.⁵ ............................................. A21B 1/00
[52] U.S. Cl. ................................ 126/21 A; 126/20.1; 34/216; 99/479; 432/128
[58] Field of Search ............... 126/21 A, 20, 20.1, 126/20.2; 432/128, 131; 99/479; 219/388; 34/216

[56] References Cited

U.S. PATENT DOCUMENTS

| | | | |
|---|---|---|---|
| 4,722,321 | 2/1988 | Meister | 126/20 |
| 4,729,470 | 3/1988 | Bacigalupe et al. | 99/479 |
| 4,792,303 | 12/1988 | Stewart et al. | 126/21 A |
| 4,906,485 | 3/1990 | Kirchhoff | 126/20 |
| 5,078,120 | 1/1992 | Hwang | 126/21 A |

FOREIGN PATENT DOCUMENTS

| | | |
|---|---|---|
| 0215340 | 3/1987 | European Pat. Off. . |
| 2166900 | 6/1976 | Fed. Rep. of Germany . |
| 2471143 | 6/1981 | France . |
| 267447 | 8/1964 | Netherlands . |
| 2109765 | 6/1983 | United Kingdom . |

Primary Examiner—Carroll B. Dority
Attorney, Agent, or Firm—Young & Thompson

[57] ABSTRACT

An oven comprises a housing and at least one heater and a conveyor belt which runs through the housing and on which food products to be heated can be accommodated. The belt runs in two helical paths about spaced parallel vertical axes, the direction of movement of the belt along one helical path, as seen from above, being opposite the direction of movement of the belt about the other helical path. The housing comprises two chambers separated by a partition, one of the helical paths of the conveyor being disposed in one chamber and the other helical path being disposed in the other chamber. The partition has an opening through which the belt runs between the chambers. In this way, different temperature levels can be maintained in the two chambers.

9 Claims, 1 Drawing Sheet

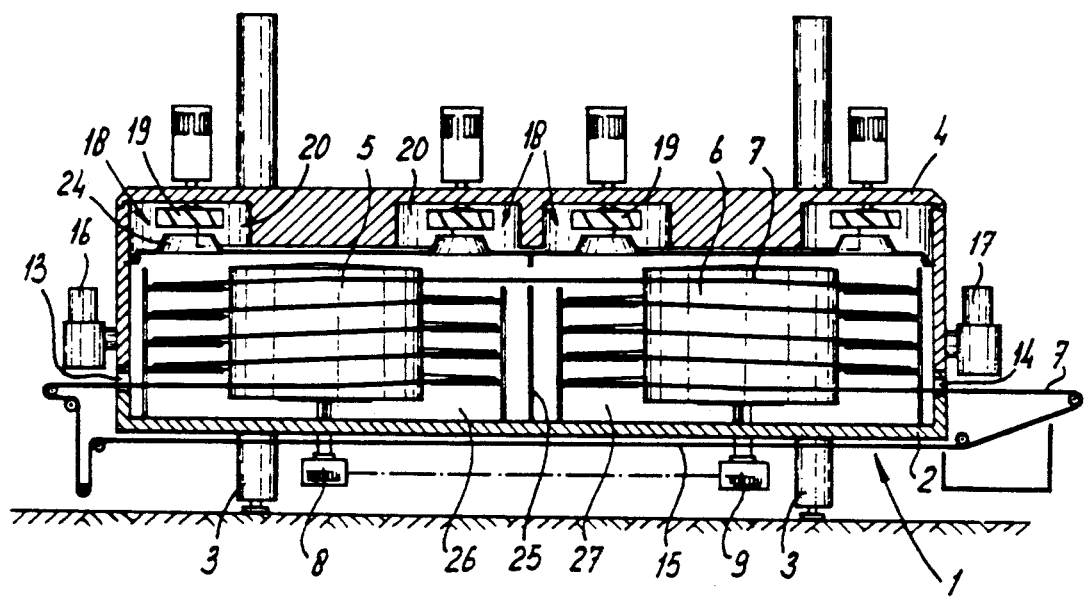
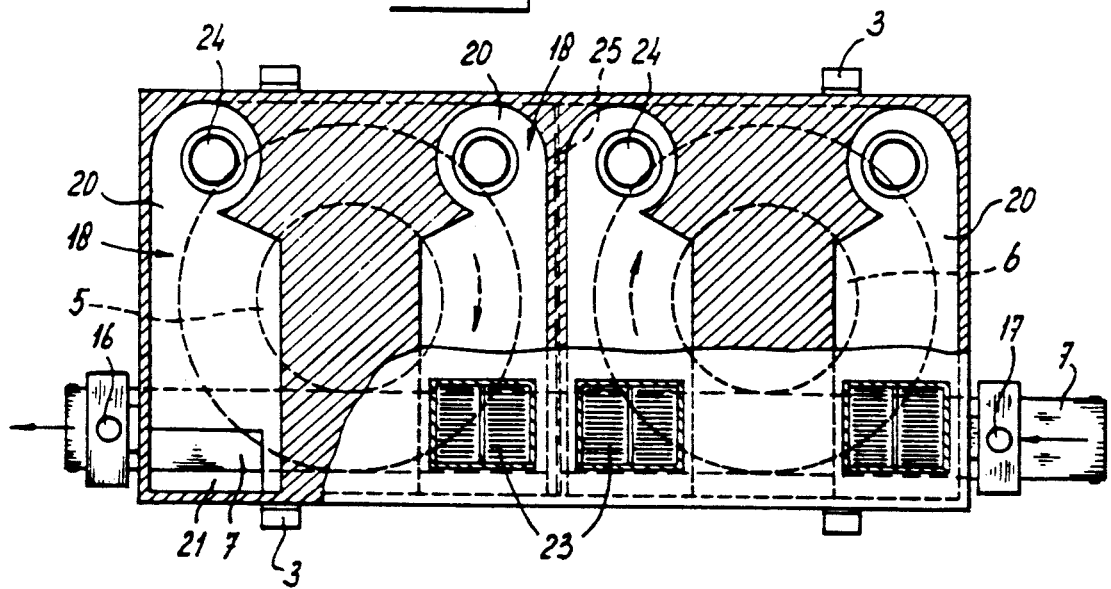

OVEN

The invention relates to an oven with a housing which has heating means and a conveyor belt which runs through the housing, and on which the food products to be heated can be accommodated, which belt follows a helical path. Such an oven is known. Owing to the helical path, which accommodates a considerable belt length, the overall dimensions of the oven can remain limited.

Ovens with a belt which follows a straight path, on the other hand, have to be of great length. Even when it is very long, the conveyor speed of the belt still has to be limited, in order to ensure that the products to be heated have a sufficiently long residence time in the oven.

However, ovens with a helical belt path also have disadvantages compared with ovens having a straight belt path. First of all, there is a great height difference between the point where the belt goes into and the point where it comes out of the housing, due to the helical course. In practice, this means that the heated products, which come out of the oven at the high level, have to be returned along a slightly sloping, and thus long, belt path to the normal working level.

Since the freshly heated products are generally still soft, they must not roll, let alone fall, in this case. The angle of inclination of the belt path in question therefore must be small. The advantage of the helical belt path in the oven, i.e. the limited measurements, is consequently partially lost again.

As a result of the considerable temperature difference inside and outside the oven and the difference in height between the inlet opening and discharge opening, a strong natural draught occurs, in which the relatively cold ambient air flows through the inlet opening of the housing, through the oven, and out through the discharge opening. This has an adverse effect on maintaining the desired climate in the oven and gives rise to a considerable energy loss.

The object of the invention is therefore to provide an oven of the abovementioned type which does not have these disadvantages. This is achieved through the fact that the belt follows a second helical path which connects to the first path, in which second path belt, viewed in the vertical direction, carries out a movement in the opposite direction to that in the first path. The first path is located in a first chamber in the housing and the second path in a second chamber in the housing, which chambers are separated by a partition provided with an opening through which the belt is conveyed. If the two chambers each have their own heating device, different conditions can be set, which is often very desirable for good treatment of the products.

The invention will be explained in greater detail below with reference to an example of an embodiment shown in the figures.

FIG. 1 shows a longitudinal section of the oven.
FIG. 2 shows a top view.

The oven shown in FIG. 1 has a base frame 1 containing a tank 2 with legs 3. These legs are equipped in a known manner with a lifting device (not shown), by means of which the cap 4 resting on the tank 2 can be lifted, in order to gain access to the inside of the oven.

The inside of the oven has two drums 5, 6. These drums have fixed supports 6, which are disposed helically along the outside of the drums, and on which the conveyor belt 7 rests. The drums 5, 6 can be driven by means of the synchronised drive motors 8, 9.

In the embodiment shown, each drum drives four windings of the conveyor belt 7. The drums turn to the right, viewed from above, so that drum 5 drives the downward moving belt section, and drum 6 the upward moving section. At the outlet opening 13 the belt leaves the oven, while it enters the oven at inlet opening 14. The returning belt part 15 runs between these two openings, outside the oven.

Extractors 16, 17 for extracting escaping vapours are placed above the belt, near the outlet opening 13 and the inlet opening 14.

Hot-air heating devices, indicated in their entirety by 18, are provided in the top of the cap. They comprise a blower 19 with a volute housing. This housing opens out into channel 20, which has an outflow opening 21 in its bottom wall.

Heating elements 23 are provided in the channel 20, in the direction of flow upstream of the outflow opening 21. These elements heat the air which has been fed in before it can flow out of outflow opening 21 down along the products on the helical paths of the conveyor belt.

The air can subsequently be sucked in again through inlet opening 24, in such a way that a continuous circulation can be maintained.

The oven is divided into two chambers 26, 27 by means of partition 25. The conveyor belt can move out of chamber 27 to chamber 26 by means of the passage 28 in the partition 25. Since both chambers 26, 27 have their own heating elements 23, different conditions can be selected in the chambers.

In the embodiment shown, the helical paths have opposite pitch angles, and the drums turn in the same direction. However, according to a variant not shown, the helical paths can have the same pitch angle, while the drums turn in opposite directions. In this case the belt runs crosswise in the part of its path extending between the two drums.

I claim:

1. An oven comprising a housing, heating means in the housing, and a conveyor belt which runs through the housing and on which food products to be heated can be accommodated, means constraining the belt to run in two helical paths about spaced parallel vertical axes, the direction of movement of the belt along one helical path, as seen from above, being opposite the direction of movement of the belt about the other helical path, the housing comprising two chambers separated by a partition, one said helical path being disposed in one said chamber and the other said helical path being disposed in the other said chamber, the partition having an opening through which the belt runs between said chambers.

2. An oven as claimed in claim 1, wherein each of said chambers has its own said heating means, whereby two different temperature zones can be formed one in each said chamber.

3. An oven as claimed in claim 1, said two paths having pitch angles of opposite sign.

4. An oven as claimed in claim 1, said two helical paths having pitch angles of the same sign.

5. An oven as claimed in claim 1, the number of windings of both said helical paths being the same, said helical windings having pitch angles that are the same.

6. An oven as claimed in claim 1, wherein the housing has an inlet opening and an outlet opening which are situated at the same level.

7. An oven as claimed in claim 1, wherein said constraining means comprises a pair of rotatable drums, and means for driving said drums in synchronism.

8. An oven as claimed in claim 1, said heating means comprising hot air heating means.

9. An oven as claimed in claim 1, said heating means comprising steam heating means.

* * * * *